(12) United States Patent
Iwai et al.

(10) Patent No.: US 9,234,553 B2
(45) Date of Patent: Jan. 12, 2016

(54) BICYCLE BRAKE DISC

(75) Inventors: Toru Iwai, Osaka (JP); Makoto Souwa, Osaka (JP)

(73) Assignee: Shimano Inc., Osaka (JP)

( * ) Notice: Subject to any disclaimer, the term of this patent is extended or adjusted under 35 U.S.C. 154(b) by 58 days.

(21) Appl. No.: 13/339,651

(22) Filed: Dec. 29, 2011

(65) Prior Publication Data

US 2013/0168193 A1   Jul. 4, 2013

(51) Int. Cl.

| F16D 65/12 | (2006.01) |
|---|---|
| F16D 65/847 | (2006.01) |
| B62L 1/00 | (2006.01) |
| F16D 55/00 | (2006.01) |
| F16D 65/02 | (2006.01) |

(52) U.S. Cl.
CPC ............... *F16D 65/847* (2013.01); *B62L 1/005* (2013.01); *F16D 65/12* (2013.01); *F16D 2055/0004* (2013.01); *F16D 2065/132* (2013.01); *F16D 2065/1316* (2013.01); *F16D 2065/1332* (2013.01); *F16D 2200/003* (2013.01); *F16D 2200/0017* (2013.01)

(58) Field of Classification Search
CPC ............... F16D 2055/0004; F16D 2055/0075; F16D 65/00; F16D 65/005; F16D 65/12; F16D 65/128; F16D 2065/13; F16D 2065/1304; F16D 2065/134; F16D 65/78; F16D 65/84; F16D 2065/1332; F16D 65/847; F16D 2065/1316
USPC .... 188/18 A, 218 XL, 264 R, 264 A, 264 AA
See application file for complete search history.

(56) References Cited

U.S. PATENT DOCUMENTS

| 2,710,078 | A | * | 6/1955 | Cardwell .................... 188/366 |
|---|---|---|---|---|
| 4,036,334 | A | * | 7/1977 | Brown ..................... 188/264 A |
| 4,913,266 | A | * | 4/1990 | Russell et al. ............. 188/18 A |
| 5,327,034 | A | | 7/1994 | Couture et al. |
| 6,386,340 | B1 | * | 5/2002 | Milesi et al. ............. 188/218 XL |
| 6,443,269 | B1 | * | 9/2002 | Rancourt ................... 188/18 A |
| 6,530,457 | B1 | * | 3/2003 | Nago et al. .................. 188/26 |
| 7,219,777 | B2 | * | 5/2007 | Lin ........................ 188/218 XL |
| 7,281,613 | B2 | * | 10/2007 | Weiss ...................... 188/264 A |
| 2003/0178265 | A1 | | 9/2003 | Chen |
| 2007/0199778 | A1 | * | 8/2007 | Lee ....................... 188/218 XL |
| 2008/0073165 | A1 | * | 3/2008 | Rau et al. ............... 188/218 XL |
| 2008/0142319 | A1 | * | 6/2008 | Manter .................. 188/218 XL |
| 2008/0202867 | A1 | * | 8/2008 | Danzer et al. ................. 188/26 |
| 2008/0289918 | A1 | * | 11/2008 | Boike et al. ............. 188/218 XL |
| 2010/0258394 | A1 | * | 10/2010 | Hanna et al. ............. 188/264 A |
| 2011/0240420 | A1 | | 10/2011 | Souwa et al. |
| 2012/0000736 | A1 | | 1/2012 | Koshiyama |

FOREIGN PATENT DOCUMENTS

| DE | 103 34 555 A1 | 2/2005 |
|---|---|---|
| TW | 276769 I | 12/1992 |
| TW | 243427 | 3/1995 |
| TW | 407172 U1 | 7/2011 |

* cited by examiner

*Primary Examiner* — Melody Burch
(74) *Attorney, Agent, or Firm* — Global IP Counselors

(57) ABSTRACT

A bicycle disc brake rotor basically has an outer portion and a cooling fin. The outer portion has first and second base surfaces facing in opposite axial directions. The cooling fin is disposed radially offset from at least one of the first and second braking surfaces.

20 Claims, 9 Drawing Sheets

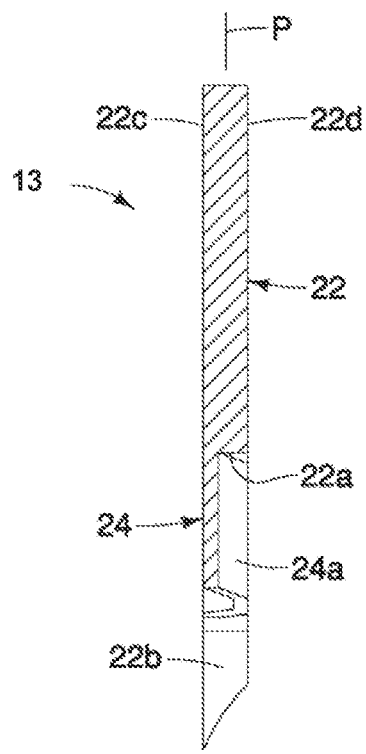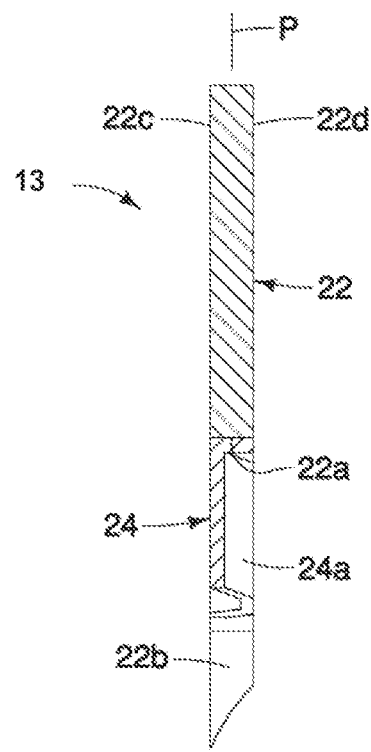
FIG. 4     FIG. 5
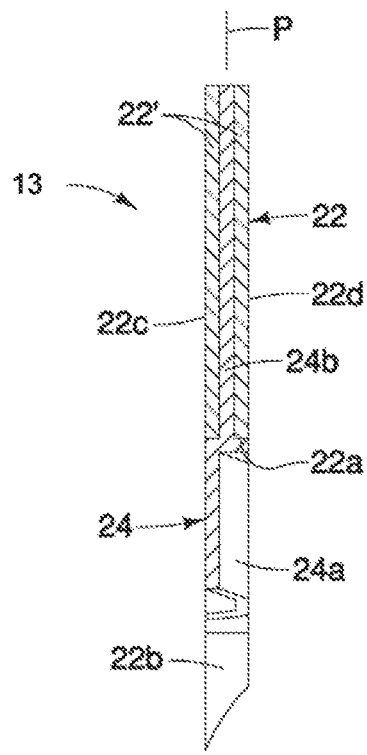
FIG. 6

BICYCLE BRAKE DISC

BACKGROUND

1. Field of the Invention

This invention generally relates to a bicycle disc brake rotor. More specifically, the present invention relates to a bicycle disc brake rotor with a configuration that promotes cooling of the braking surfaces.

2. Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or back wheel of a bicycle. The brake pads are pressed against a brake disc or rotor that is fixed to the wheel to slow down or stop the rotation of the disc, and thus, slow down or stop the rotation of the wheel.

SUMMARY

While disc brake systems provide excellent performance, the braking action tends to generate a substantial amount of heat in the disc brake rotor. Thus, one aspect present in this disclosure is to provide a disc brake rotor with a configuration that more efficiently radiates heat from the outer portion of the disc brake rotor. Another aspect present in this disclosure is to provide a disc brake rotor with a cooling fin that relatively easy to produce.

In view of the state of the known technology, a bicycle disc brake rotor is basically provided that comprises an outer portion and a cooling fin. The outer portion has first and second base surfaces facing in opposite axial directions. The cooling fin is disposed radially offset from at least one of the first and second braking surfaces.

These and other objects, features, aspects and advantages of the disclosed bicycle disc brake rotor will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 4 is a cross sectional view of the bicycle disc brake rotor illustrated in FIGS. 1 and 2 as seen along section line 4-4 of FIG. 2 with a first construction;

FIG. 5 is a cross sectional view, similar to FIG. 4, of the bicycle disc brake rotor illustrated in FIGS. 1 and 2 with a second construction;

FIG. 6 is a cross sectional view, similar to FIG. 4, of the bicycle disc brake rotor illustrated in FIGS. 1 and 2 with a third construction;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
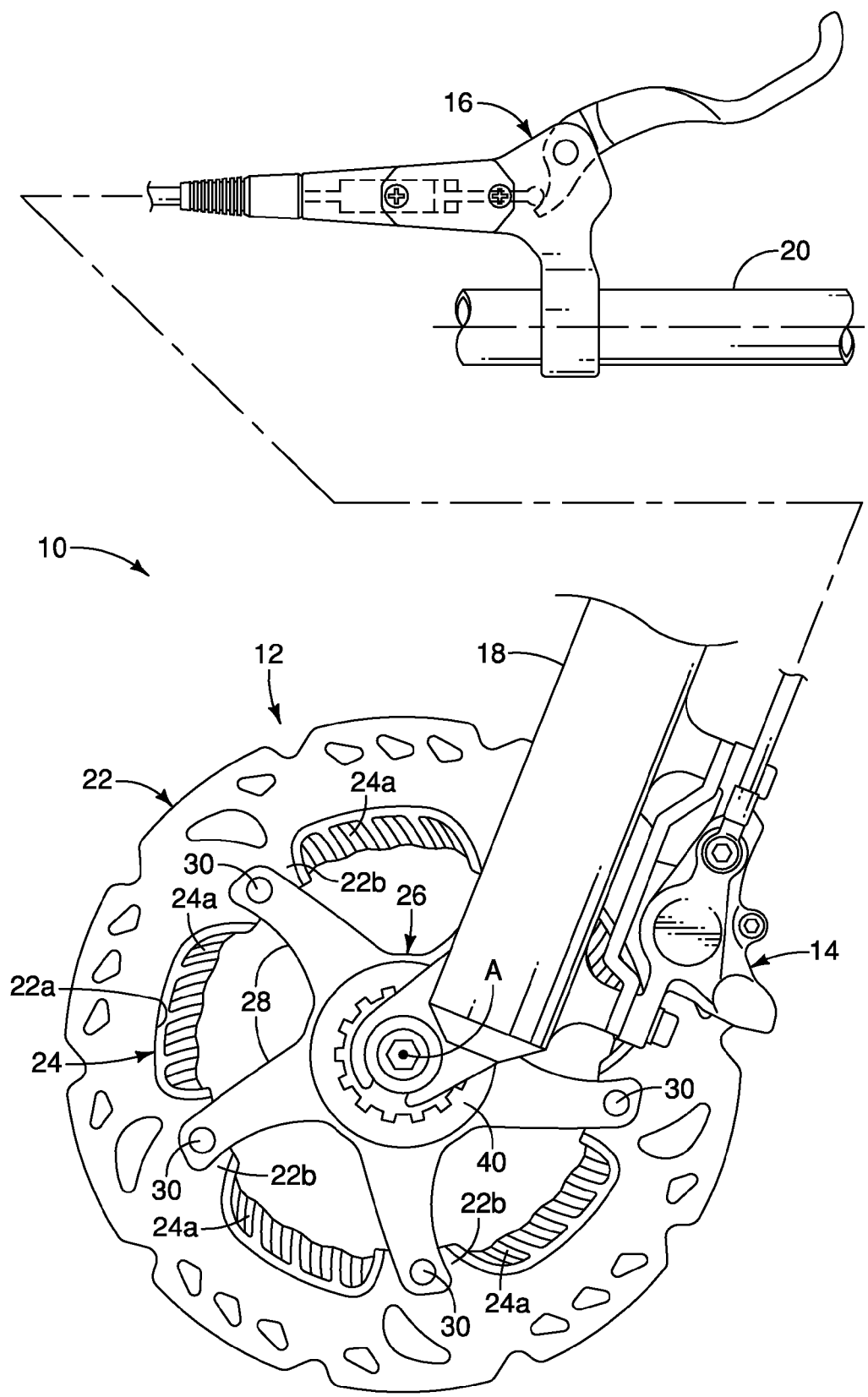
FIG. 1 is a partial side elevational view of a front disc brake system including a bicycle disc brake rotor in accordance with a first embodiment.

Referring initially to FIG. 1, a front disc brake system 10 is illustrated that includes a bicycle disc brake rotor 12 in accordance with a first embodiment. As explained below, the bicycle disc brake rotor 12 includes a bicycle brake disc 13 having a configuration that promotes cooling of the bicycle disc brake rotor 12. The front disc brake system 10 further includes a bicycle disc brake caliper 14 and a brake operating (actuating) mechanism 16. Basically, the bicycle disc brake rotor 12 is fixedly attached to a hub of a bicycle wheel (not shown). The bicycle disc brake caliper 14 is mounted to a bicycle fork 18, while brake operating mechanism 16 is attached to a bicycle handlebar 20. Since the operation and construction of the front disc brake system 10 is conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Referring now to FIGS. 2 to 6, the bicycle disc brake rotor 12 includes a bicycle brake disc 13 having an outer portion 22 and a cooling fin 24. The cooling fin 24 is disposed on an inner peripheral edge 22a of the outer portion 22 and extends towards a center rotational axis A of the bicycle disc brake rotor 12. The cooling fin 24 is connected to the outer portion 22 to efficiently radiate heat from the outer portion 22 of the disc brake rotor 12. In this first embodiment, the cooling fin 24 includes a plurality (five) of wavy shaped portions 24a. The wavy shaped portions 24a are annularly disposed about the center rotational axis A of the bicycle disc brake rotor 12 and circumferentially spaced apart from each other. As seen in FIGS. 4 to 6, the outer portion 22 and the cooling fin 24 (i.e., the bicycle brake disc 13) can be integrally formed as a one-piece member (FIG. 4) or separate members (FIGS. 5 and 6) that are secured (e.g. bonded by welding, brazing, etc.) together. The cooling fin 24 can be connected to the outer portion 22 in a variety of manners. For example, as seen in FIG. 5, the outer portion 22 and the cooling fin 24 can be separate members that are secured to the inner peripheral edge 22a of the outer portion 22 by a suitable bond (e.g. bonded by welding, brazing, etc.). Alternatively, as seen in FIG. 6, the outer portion 22 includes first and second braking parts 22', and the cooling fin 24 further includes an attachment portion 24b that is sandwiched between the first and second braking parts 22'. The attachment portion 24b can be a single piece with each of the wavy shaped portions 24a integrally formed therewith as a one-piece member. Alternatively, the attachment portion 24b can be a several pieces (e.g., five pieces) with one of the wavy shaped portions 24a integrally formed with one of the pieces.

By making the outer portion 22 and the cooling fin 24 as separate members that are secured together, the materials of the outer portion 22 and the cooling fin 24 can be different. Preferably, the outer portion 22 is formed of a material with corrosion resistant characteristic that is suitable for brake pad contact such as, for example, stainless steel, while the cooling fin 24 are formed of a metallic material with corrosion resistant characteristic such as aluminum alloy, stainless steel or other suitable material. Preferably, the material of the cooling fin 24 has a higher thermal conductivity than the outer portion 22.

Here in the first illustrated embodiment, the bicycle disc brake rotor 12 further includes a hub mounting portion 26 that is connected to a plurality of mounting portions 22b of the outer portion 22. A plurality of connecting arms 28 extends radially inward from the outer portion 22 to the hub mounting portion. Thus, the outer portion 22 is coupled to outer ends of the connecting arms 28 and the connecting arms 28 and the hub mounting portion 26 is coupled to inner ends of the connecting arms 28. In the first illustrated embodiment, the hub mounting portion 26 and the connecting arms 28 are integrally formed as a one-piece member of a suitable material such as aluminum alloy or other suitable lightweight material. The outer ends of the connecting arms 28 are attached to the outer portion 22 by suitable fasteners 30 (e.g., rivets). Of course, it will be apparent to those skilled in the art from this disclosure that the outer portion 22, the connecting arms 28 and the hub mounting portion 26 can be integrally formed as a one-piece member. Alternatively, the outer portion 22 and the connecting arms 28 can be integrally formed as a one-piece member that is attached to the hub mounting portion 26. Also alternatively, the connecting arms 28 can be separate pieces that are attached to both the outer portion 22 and the hub mounting portion 26 by suitable fasteners.

In the first illustrated embodiment, the mounting portions 22b of the outer portion 22 are disposed between adjacent ones of the wavy shaped portions 24a. To maximize the dissipation of the heat from the outer portion 22, it is preferably to have one of the wavy shaped portions 24a disposed between each of the mounting portions 22b and spanning the entire area therebetween. Of course, if needed and/or desired, fewer wavy shaped portions can be used. Also each of the wavy shaped portions 24a has a wavy shape with respect to a rotational plane P of the bicycle disc brake rotor 12 (bicycle brake disc 13) to increase the exposed surface area of the fin portions 24a. The wavy shape of the wavy shaped portions 24a refers to alternating crests 24d and troughs 24e to form a sinusoidal shape. While the sinusoidal shape is illustrated as having uniform crests and troughs, the sinusoidal shape can be irregular with different shapes for some or all of the crests and troughs. Also, in the first illustrated embodiment, each of the crests and each of the troughs is defined by three adjoining planar surfaces. The three planar surfaces defining each of the crests 24d include a topmost surface 24f, and the three planar surfaces defining each of the crests 24d include a bottommost surface 24g. However, other configurations of the fin portions 24a are possible.

The outer portion 22 of the bicycle brake disc 13 has first and second base surfaces 22c and 22d that face in opposite axial directions of the bicycle disc brake rotor 12 (bicycle brake disc 13). The first and second base surfaces 22c and 22d are the outermost surfaces of the bicycle disc brake rotor 12 (bicycle brake disc 13). The first base surface 22c of the outer portion 22 forms a first braking surface, while the second base surface 22d of the outer portion 22 forms a second braking surface. The cooling fin 24 is disposed radially offset from the first and second base (braking) surfaces 22c and 22d in the illustrated embodiment. Of course, it is possible to produce a base rotor plate having an outer portion with braking surfaces with unequal radial dimensions such that the cooling fin 24 radially offset from at least one of the first and second braking surfaces. Here in the first illustrated embodiment, the outer portion 22 has a maximum thickness of about 2.4 millimeters. Preferably, the wavy shaped portions 24a are disposed entirely between the first and second base surfaces 22c and 22d of the outer portion 22 of the bicycle disc brake rotor 12 (bicycle brake disc 13) as seen in FIGS. 4 to 6.

Figure 2:
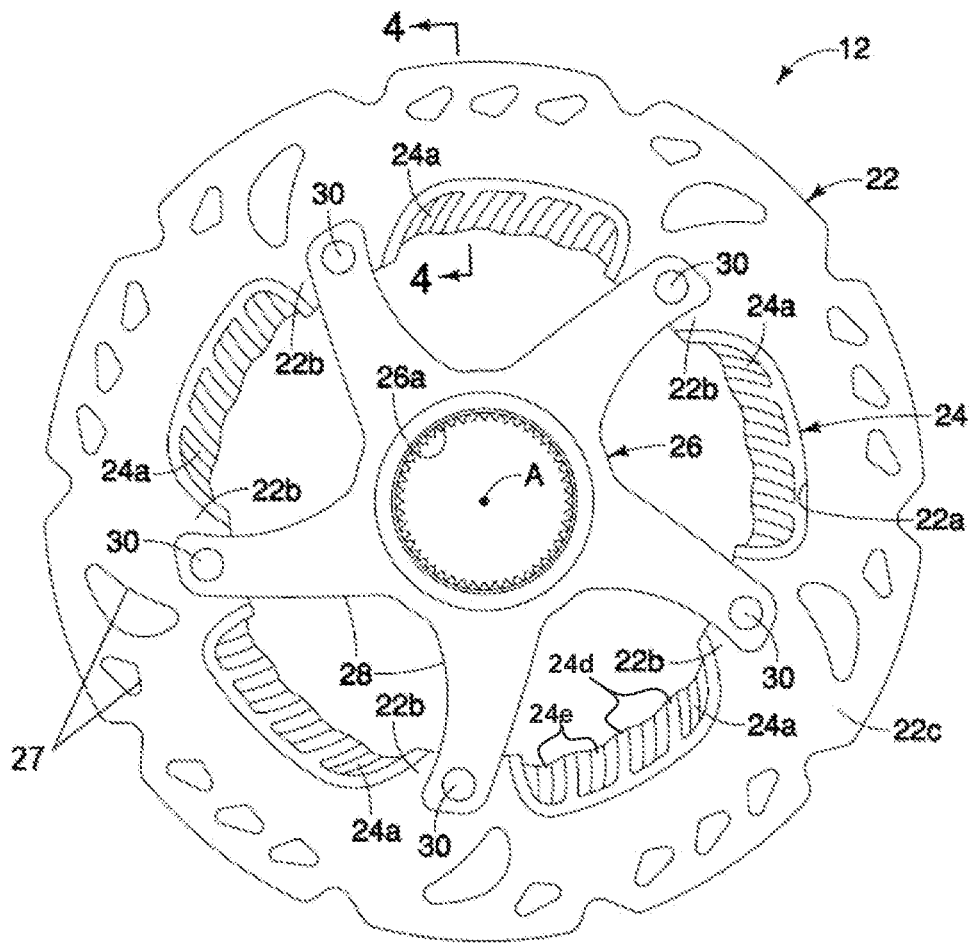
FIG. 2 is a side elevational view of the disc brake rotor illustrated in FIG. 1.
Figure 3:
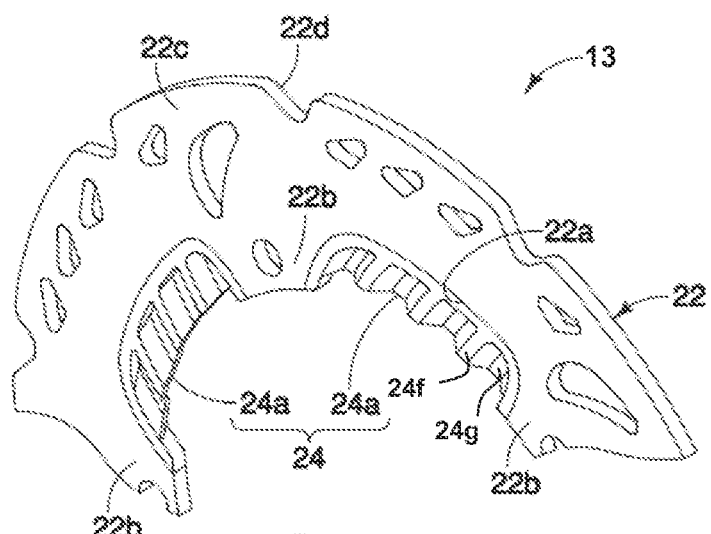
FIG. 3 is an enlarged perspective view of the bicycle disc brake rotor illustrated in FIGS. 1 and 2.

In the first illustrated embodiment, as seen in FIGS. 1 and 2, the hub mounting portion 26 is integrally formed at the inner ends of the connecting arms 28 as a one-piece member of a suitable first material such as aluminum alloy or other suitable lightweight material. The hub mounting portion 26 includes a mounting opening 26a with splines for accommodating a hub axle therethrough. The hub mounting portion 26 is mounted to a bicycle hub by a locking ring 40 as seen in FIG. 1. Thus, the bicycle disc brake rotor 12 rotates with the bicycle hub about the center rotational axis A.

Figure 7:
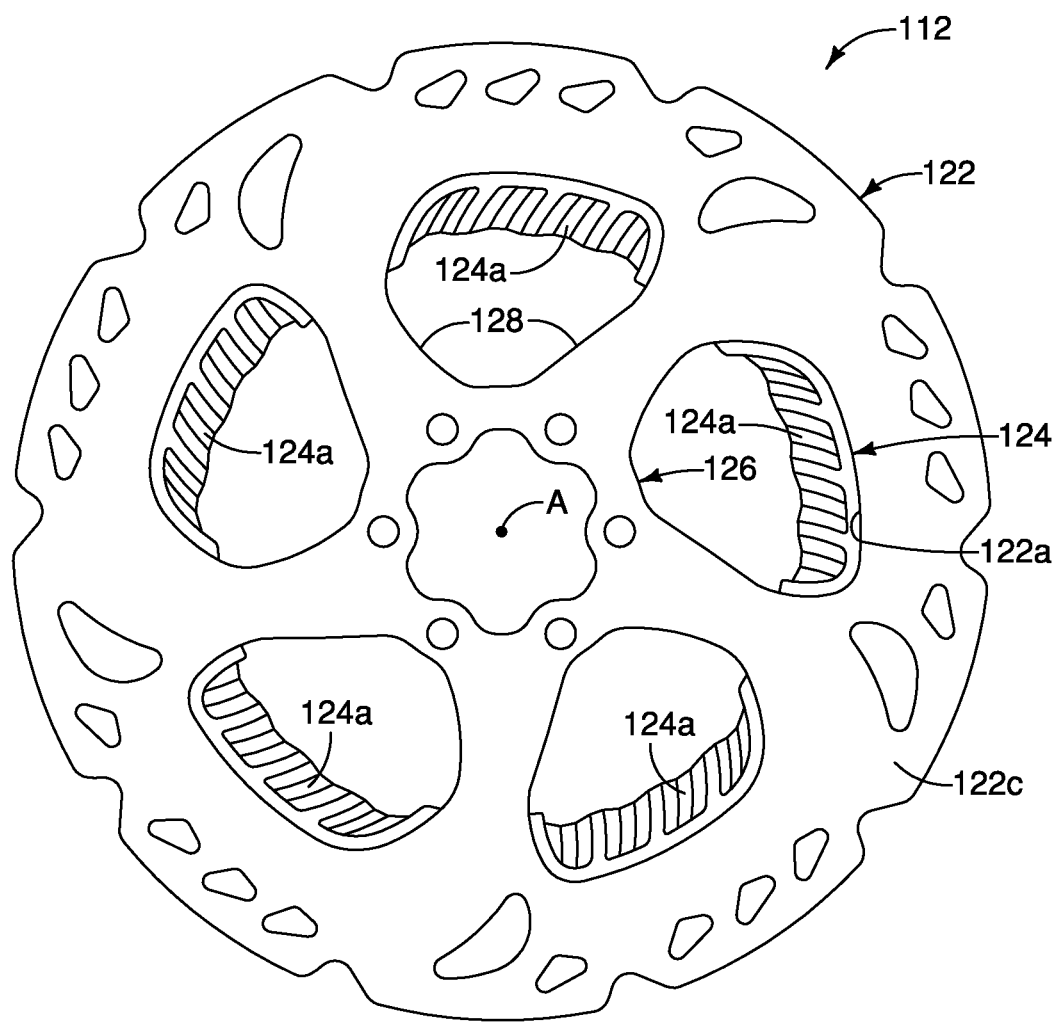
FIG. 7 is a side elevational view of a disc brake rotor in accordance with a second embodiment.
Figure 8:
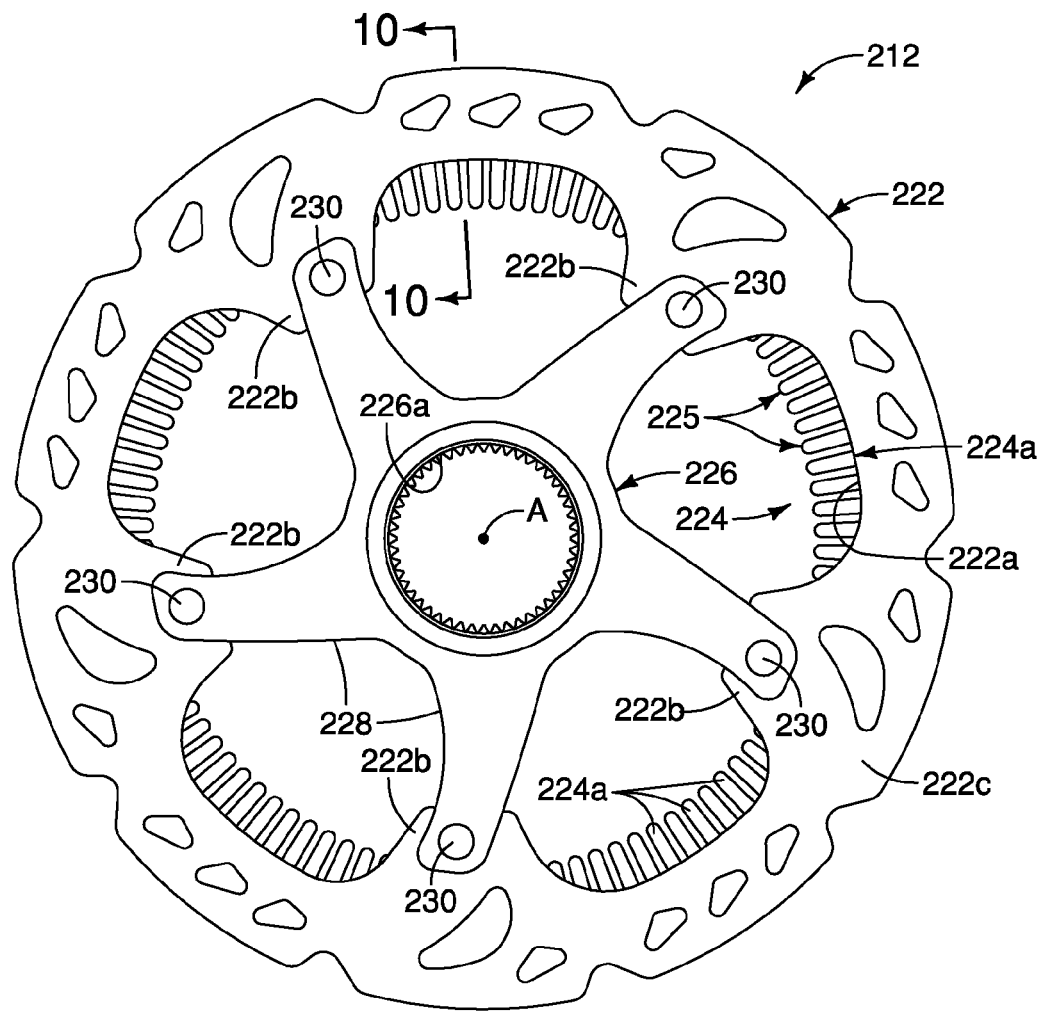
FIG. 8 is a side elevational view of a disc brake rotor in accordance with a third embodiment.

Referring now to FIG. 7, a bicycle disc brake rotor 112 is illustrated in accordance with a second embodiment. The bicycle disc brake rotor 112 includes an outer portion 122 and a cooling fin 124 having a plurality of wavy shaped portions 124a. The cooling fin 124 is identical to the cooling fin 24. The cooling fin 124 can be either integrally formed with the outer portion 122 in the same manner as the cooling fin 24 as shown in FIG. 4, or attached to the outer portion 122 in the same manner as the cooling fin 24 as shown in FIG. 5 or 6. The bicycle disc brake rotor 112 further includes a hub mounting portion 126 and a plurality of connecting arms 128 extending radially between the outer portion 122 and the hub mounting portion 126. Basically, the bicycle disc brake rotor 112 is identical to the bicycle disc brake rotor 12, as described above, except that the outer portion 122 is integrally formed with both the hub mounting portion 126 and the connecting arms 128 in this second embodiment. Thus, the bicycle disc brake rotor 112 is a flat plate formed of a material suitable for contact with the brake pads. In view of the similarity between the first and second embodiments, further description of the second embodiment will be omitted for the sake of brevity.

Figure 9:
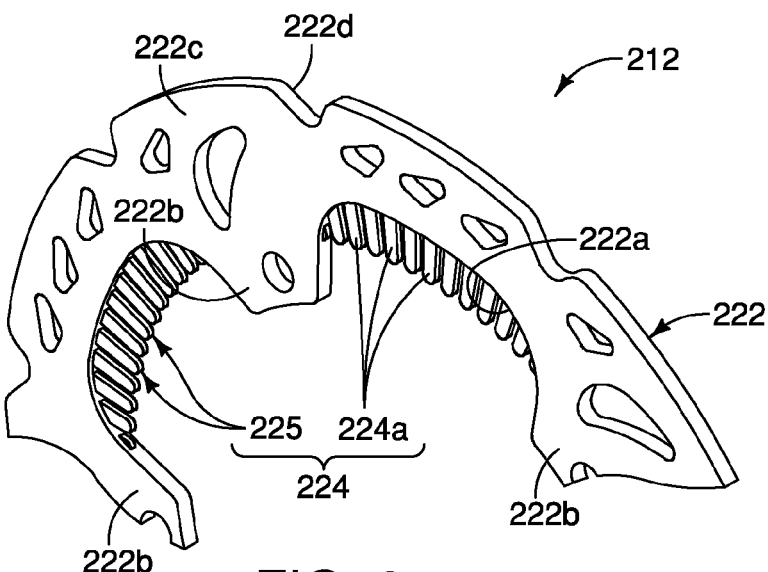
FIG. 9 is an enlarged perspective view of the bicycle disc brake rotor illustrated in FIG. 8.
Figure 10:
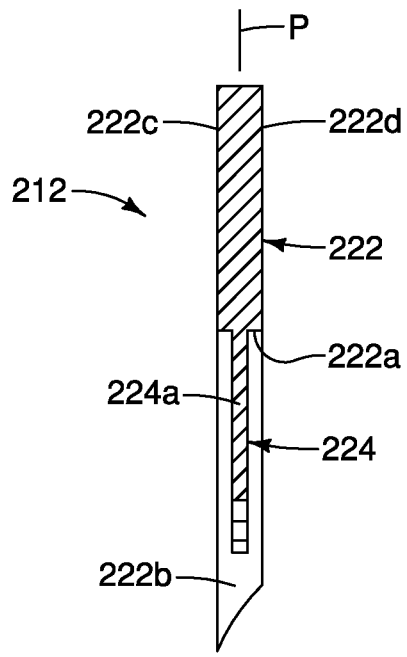
FIG. 10 is a cross sectional view of the bicycle disc brake rotor illustrated in FIGS. 8 and 9 as seen along section line 10-10 of FIG. 8 with a first construction.
Figure 11:
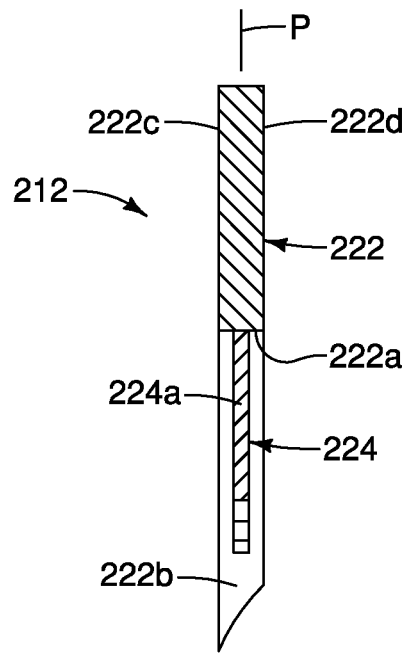
FIG. 11 is a cross sectional view of the bicycle disc brake rotor illustrated in FIGS. 8 and 9 with a second construction.
Figure 12:
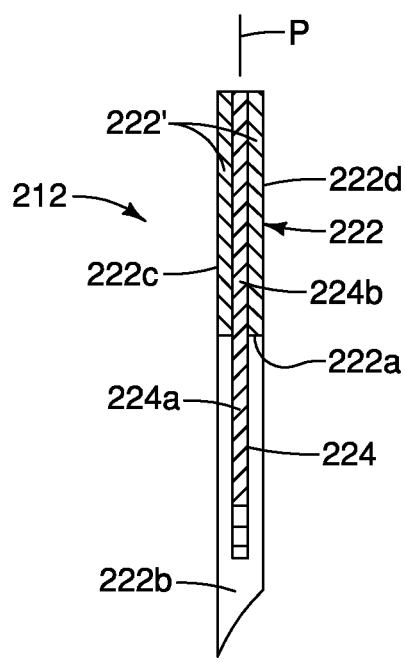
FIG. 12 is a cross sectional view of the bicycle disc brake rotor illustrated in FIGS. 8 and 9 with a third construction.
Figure 13:
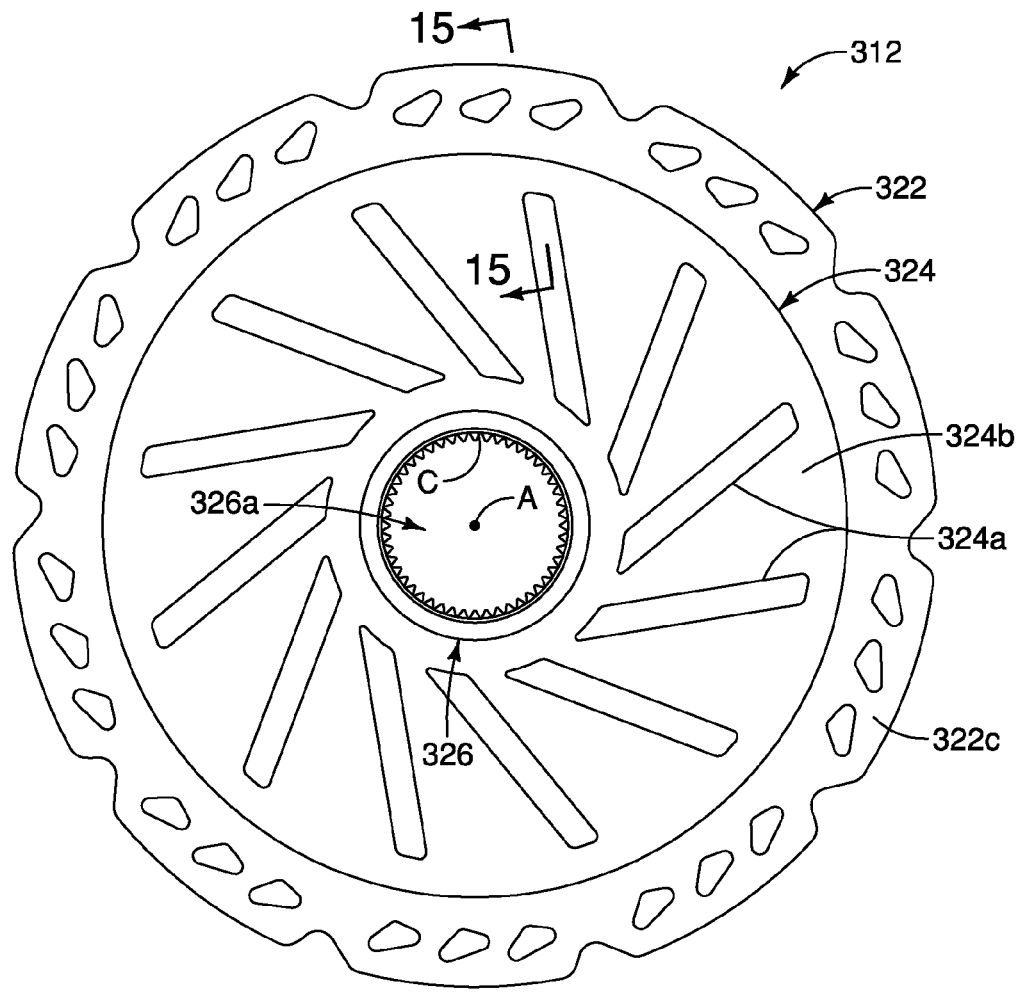
FIG. 13 is a side elevational view of a disc brake rotor in accordance with a fourth embodiment.
Figure 14:
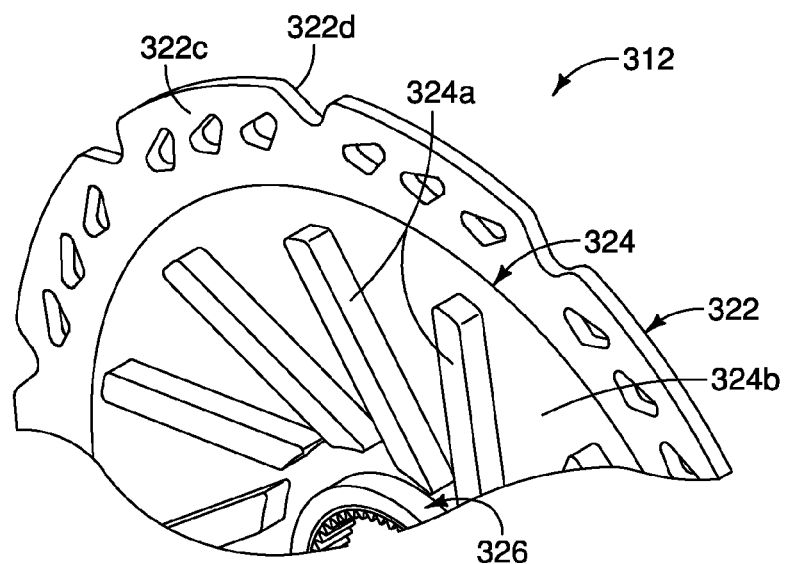
FIG. 14 is an enlarged perspective view of the bicycle disc brake rotor illustrated in FIG. 13.

Referring now to FIGS. 8 to 12, a bicycle disc brake rotor 212 is illustrated in accordance with a third embodiment. The bicycle disc brake rotor 212 includes an outer portion 222 and a cooling fin 224. The cooling fin 224 has a plurality of fin portions 224a extending radially inward from an inner peripheral edge 222a of the outer portion 222 toward the center rotational axis A of the bicycle disc brake rotor 212. The cooling fin 224 can be either integrally formed with the outer portion 222 as shown in FIG. 10, or attached to the outer portion 222 in as shown in FIG. 11 or 12. The bicycle disc brake rotor 212 further includes a hub mounting portion 226 and a plurality of connecting arms 228 extending radially between the outer portion 222 and the hub mounting portion 226. The hub mounting portion 226 is mounted a plurality of mounting portions 223b, similar to the first embodiment, Basically, the bicycle disc brake rotor 212 is identical to the bicycle disc brake rotor 12, as described above, except that the cooling fin 224 has a different configuration in this third embodiment from the cooling fin 24 of the first embodiment. In view of the similarity between the first and third embodiments, further description of the third embodiment will be limited to the configuration of the cooling fin 224.

Here in the third embodiment, the fin portions 224a individually extending members that extend radially inward from the inner peripheral edge 222a of the outer portion 222 toward the center rotational axis A of the bicycle disc brake rotor 212. As seen in FIG. 9, the fin portions 224a are protrusions extending radially inward towards the center rotational axis A of the bicycle disc brake rotor 212. The cooling fin 224 has a plurality slits 225 separating the fin portions 224a in the circumferential direction of the outer portion 222. The fin portions 224a (e.g., the protrusions) are illustrated as elongated plates that are cantilevered relative to the outer portion 222. The fin portions 224a has flat axially facing surfaces with flat circumferentially facing surfaces such that the fin portions 224a have a rectangular cross sectional profile in the circumferential direction. However, the fin portions 224a can have other configurations such as circular, oval, teardrop, etc. as needed and/or desired. Preferably, the fin portions 224a are disposed entirely between first and second base surfaces 222c and 222d of the outer portion 222 of the bicycle disc brake rotor 212.

As seen in FIGS. 10 to 12, the outer portion 222 and the cooling fin 224 can be integrally formed as a one-piece member (FIG. 10) or separate members (FIGS. 11 and 12) that are secured (e.g. bonded by welding, brazing, etc.) together. As seen in FIG. 11, the outer portion 222 and the cooling fin 224 can be separate members that are secured to the inner peripheral edge 222a of the outer portion 222 by a suitable bond (e.g. bonded by welding, brazing, etc.). Alternatively, as seen in FIG. 12, the outer portion 222 includes first and second braking parts 222', and the cooling fin 224 further includes an attachment portion 224b that is sandwiched between the first and second braking parts 222'. Preferably, the attachment portion 224b can be a single piece with each of the fin portions 224a integrally formed therewith as a one-piece member.

Referring now to FIGS. 13 to 17, a bicycle disc brake rotor 312 in accordance with a fourth embodiment will now be explained. Here, the bicycle disc brake rotor 312 includes an outer portion 322 and a cooling fin 324. The bicycle disc brake rotor 312 further includes a hub mounting portion 326. In view of the similarity between the fourth embodiment and the prior embodiments, further description of the fourth embodiment will be limited to the configuration of the cooling fin 324.

Figure 15:
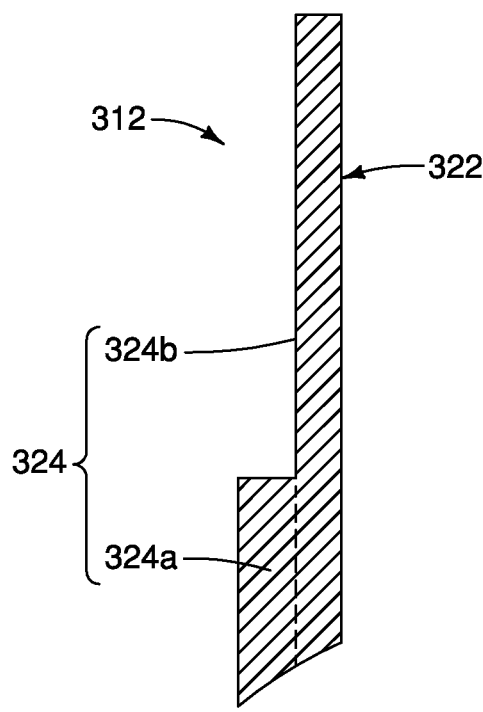
FIG. 15 is a cross sectional view of the bicycle disc brake rotor illustrated in FIGS. 12 and 13 as seen along section line 15-15 of FIG. 13 with a first construction.
Figure 16:
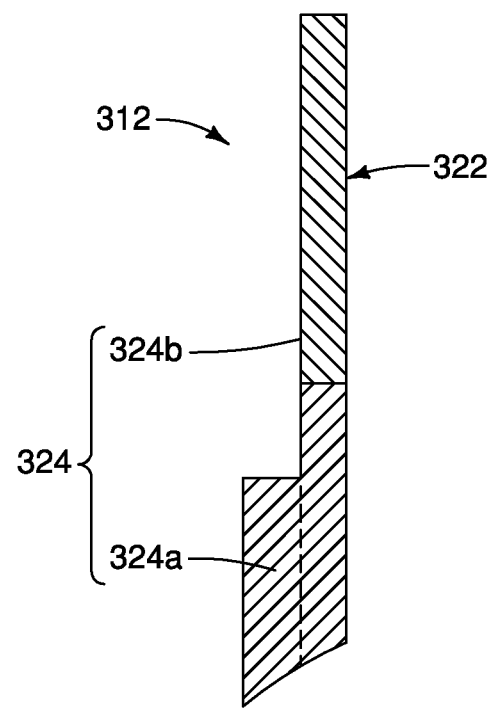
FIG. 16 is a cross sectional view of the bicycle disc brake rotor illustrated in FIGS. 12 and 13 with a second construction.
Figure 17:
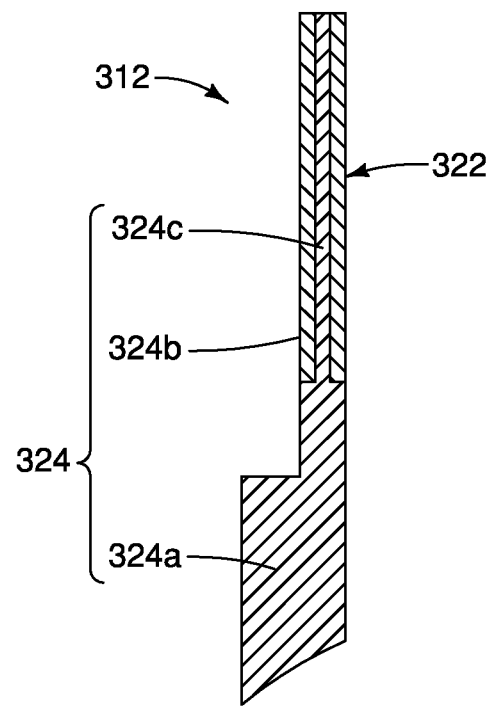
FIG. 17 is a cross sectional view of the bicycle disc brake rotor illustrated in FIGS. 12 and 13 with a third construction.

Here, the cooling fin 324 extends radially between the outer portion 322 and the hub mounting portion 326 for connecting the outer portion 322 to the hub mounting portion 326. The cooling fin 324 can be either integrally formed with the outer portion 322 as shown in FIG. 15, or attached to the outer portion 322 in as shown in FIG. 16 or 17. Preferably, as seen in FIG. 17, the outer portion 322 includes first and second braking parts 322', and the cooling fin 324 further includes an attachment portion 324c that is sandwiched between the first and second braking parts 322'. Also, the cooling fin 324 can be either integrally formed with the hub mounting portion 326 as shown in FIGS. 13 to 17, or attached to the hub mounting portion 326 by fasteners (not shown).

The cooling fin 324 includes a plurality of protruding members 324a and a disc shaped portion 324b. In the fourth embodiment, the cooling fin 324 is illustrated as having a plurality of protruding members 324a. However, a single protruding member (e.g., a single spiral protruding member) can be used if needed and/or desired. Thus, the protruding members 324a constitute a protrusion of cooling fin 324. The protruding members 324a extend in an axial direction from the disc shaped portion 324b with respect to the center rotational axis A of the bicycle disc brake rotor 312. The disc shaped portion 324b constitutes an intermediate or connection portion that interconnects the outer portion 322 and the hub mounting portion 326. In the fourth embodiment, the protruding members 324a are protruding blocks that are tangentially arranged with respect to a reference circle C that is centered about the center rotational axis A of the bicycle disc brake rotor 312. The reference circle C coincides with outer periphery of the mounting opening 326a of the hub mounting portion 326. Of course, the protruding members 324a can be tangentially arranged with respect to other reference circles that are centered about the center rotational axis A as needed and/or desired.

Figure 18:
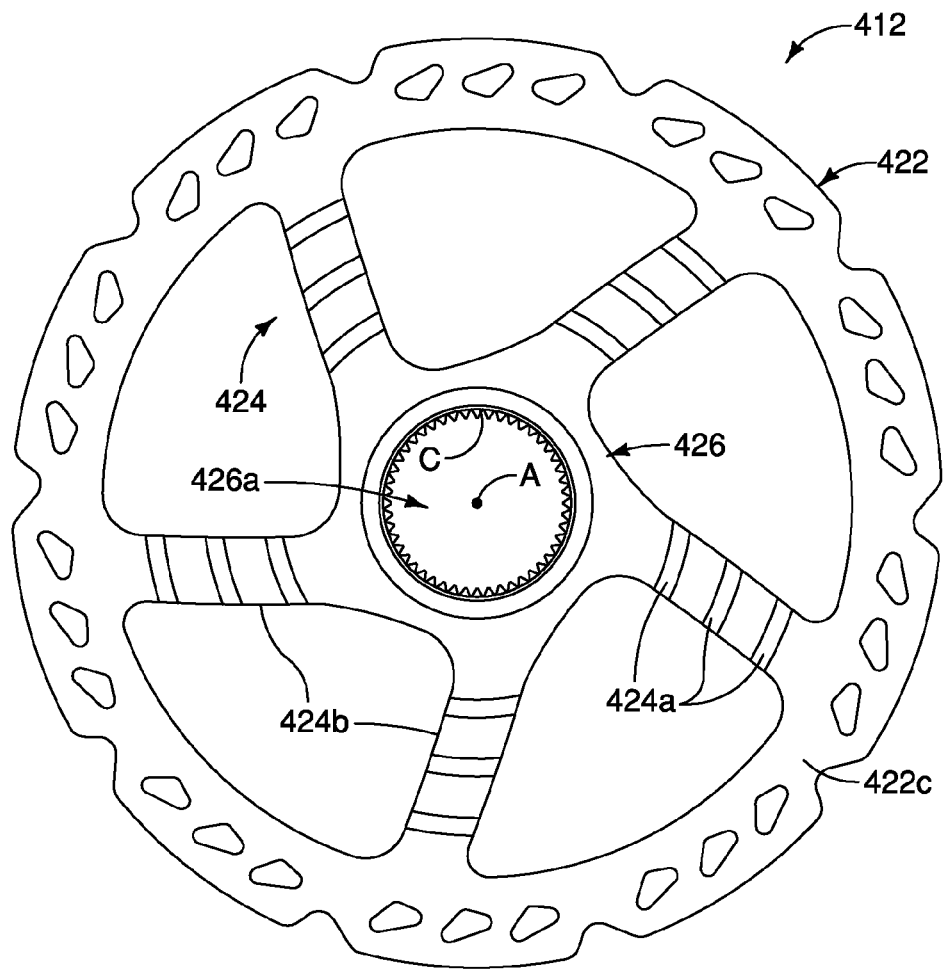
FIG. 18 is a side elevational view of a disc brake rotor in accordance with a fifth embodiment.
Figure 19:
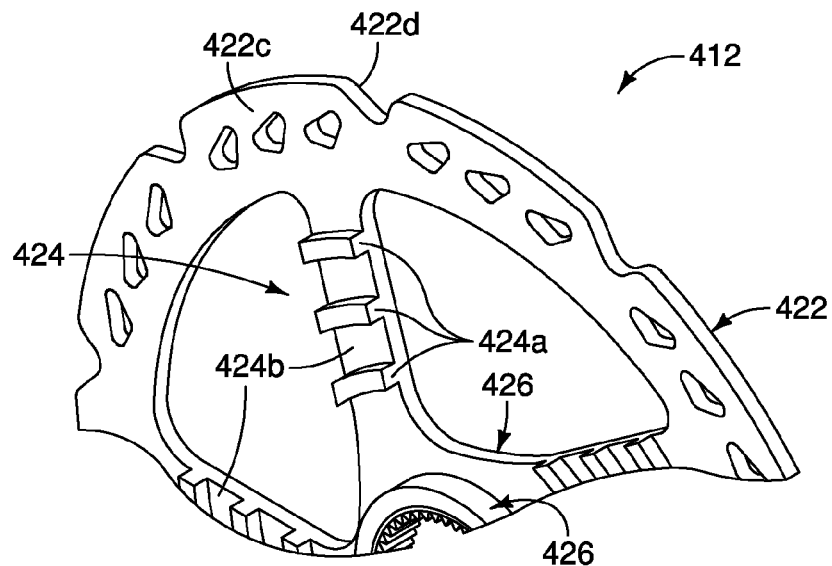
FIG. 19 is an enlarged perspective view of the bicycle disc brake rotor illustrated in FIG. 18.

Referring now to FIGS. 18 and 19, a bicycle disc brake rotor 412 in accordance with a fifth embodiment will now be explained. Here, the bicycle disc brake rotor 412 includes an outer portion 422 and a cooling fin 424. The bicycle disc brake rotor 412 further includes a hub mounting portion 426. In view of the similarity between the fifth embodiment and the prior embodiments, further description of the fifth embodiment will be limited to the configuration of the cooling fin 424.

Here, the cooling fin 424 is an intermediate arm portion that extends radially between the outer portion 422 and the hub mounting portion 426 for connecting the outer portion 422 to the hub mounting portion 426. The cooling fin 324 includes a plurality of protruding members 424a and a plurality of connecting arms 424b (i.e., the intermediate arm portion). The cooling fin 424 can be either integrally formed with the outer portion 422 and the hub mounting portion 426 as shown in FIGS. 18 and 19, or attached to the outer portion 422 similar to the first embodiment.

The connecting arms 424b (the intermediate arm portion) have outer ends integrally formed as a one-piece member with the outer portion 422. The connecting arms 424b extend radially inward from the outer portion 422 towards the center rotational axis A of the bicycle disc brake rotor 412. The connecting arms 424b have inner ends integrally formed as a one-piece member with the outer portion 422. The protruding members 424a extend in an axial direction from the connecting arms 424b with respect to the center rotational axis A of the bicycle disc brake rotor 412. While the protruding members 424a are illustrated as arc-shaped block members, the protruding members 424a can have other configurations. For example, the connecting arms 424b can each be provided with one or more linear shaped blocks that are tangentially arranged with respect to other a reference circle that is centered about the center rotational axis A.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle brake disc comprising:
an outer portion that has first and second braking surfaces facing in opposite axial directions of the bicycle brake disc, the outer portion forming a radially outermost edge of the bicycle brake disc, and
a cooling fin that is disposed radially offset from at least one of the first and second braking surfaces, the cooling fin including a plurality of wavy shaped portions, each of the wavy shaped portions including a plurality of alternating crests and troughs that protrude and recess in the axial directions of the bicycle brake disc with respect to a center rotational plane of the bicycle brake disc, the wavy shaped portions being non-continuously disposed about a center rotational axis of the bicycle brake disc and circumferentially separated from each other by areas of differently shaped portions,
the wavy shaped portions being provided on an inner peripheral edge of the outer portion, the wavy shaped portions forming portion of a radially innermost peripheral edge of the bicycle brake disc.

2. The bicycle brake disc according to claim 1, wherein each of the differently shaped portions is a mounting portion.

3. The bicycle brake disc according to claim 2, wherein each of the mounting portions protrudes radially inward from the first and second braking surfaces of the outer portion, and one of the wavy shaped portions is disposed circumferentially between each adjacent pair of the mounting portions.

4. The bicycle brake disc according to claim 3, wherein each of the wavy shaped portions spans the entire area between each of the adjacent pairs of the mounting portions.

5. The bicycle brake disc according to claim 3, wherein there are five of the mounting portions and five of the wavy shaped portions.

6. The bicycle brake disc according to claim 1, wherein the outer portion and the cooling fin are separate members that have been secured together.

7. The bicycle brake disc according to claim 6, wherein the outer portion is made of a material that is different from a material from which the cooling fin is made.

8. The bicycle brake disc according to claim 7, wherein the cooling fin is made of a material having a higher thermal conductivity than the material of the outer portion.

9. The bicycle brake disc according to claim 7, wherein the outer portion and the cooling fin are each made of a metallic material.

10. The bicycle brake disc according to claim 9, wherein the cooling fin is made of a material having a higher thermal conductivity than the material of the outer portion.

11. The bicycle brake disc according to claim 1, wherein the outer portion is provided with at least one ventilation opening that passes axially through the outer portion.

12. The bicycle brake disc according to claim 1, wherein each of the wavy shaped portions is disposed entirely between the first and second braking surfaces with respect to the axial direction of the bicycle brake disc.

13. The bicycle brake disc according to claim 12, wherein the outer portion has a maximum thickness of 2.4 millimeters in the axial direction of the bicycle brake disc.

14. The bicycle brake disc according to claim 1, wherein the outer portion and the cooling fin are formed as a one-piece member.

15. The bicycle brake disc according to claim 1, wherein each of the differently shaped portions spans a circumferential angular distance at least as large as a circumferential angular pitch between two adjacent crests or two adjacent troughs of the wavy shaped portions.

16. The bicycle brake disc according to claim 1, wherein the alternating crests and troughs are configured such that the radially innermost edge of the bicycle brake disc has a sinusoidal shape at the wavy shaped portions, a bottommost surface of each trough on one axially facing surface of the wavy shaped portions being axially adjacent a topmost surface of a crest on an opposite axially facing surface of the wavy shaped portions.

17. A bicycle brake disc comprising:
an outer portion that has first and second braking surfaces facing in opposite axial directions of the bicycle brake disc, the outer portion forming a radially outermost edge of the bicycle brake disc;
a plurality of connecting arms extending radially inward from an inner peripheral edge of the outer portion, the outer portion and the connecting arms being formed integrally as a one-piece member;
a cooling fin that is disposed radially offset from at least one of the first and second braking surfaces, the cooling fin including at least one wavy shaped portion that is disposed entirely between the first and second braking surfaces with respect to the axial direction of the bicycle brake disc,
the at least one wavy shaped portion being provided on the inner peripheral edge of the outer portion, the at least one wavy shaped portion forming portion of a radially innermost peripheral edge of the bicycle brake disc, the wavy shape of the at least one wavy shaped portion comprising alternating crests and troughs that protrude and recess in the axial directions with respect to a center rotational plane of the bicycle brake disc.

18. The bicycle brake disc according to claim 17, wherein each of the crests and each of the troughs is defined by three adjoining planar surfaces of the wavy shaped portion.

19. The bicycle brake disc according to claim 17, wherein the alternating crests and troughs are configured such that the radially innermost edge of the bicycle brake disc has a sinusoidal shape at the at least one wavy shaped portion, a bottommost surface of each trough on one axially facing surface of the at least one wavy shaped portion being axially adjacent a topmost surface of a crest on an opposite axially facing surface of the at least one wavy shaped portion.

20. The bicycle brake disc according to claim 17, wherein the at least one wavy shaped portion is disposed between two adjacent ones of the connecting arms.

* * * * *